United States Patent [19]

Tagnon

[11] 3,931,947
[45] Jan. 13, 1976

[54] ADJUSTABLE BASE, NOTABLY FOR TOPOMETRY APPARATUS

[75] Inventor: Luc Andre Tagnon, Saint Mande, France

[73] Assignee: Essilor International (Compagnie Generale d'Optique), Joinville-le-Pont, France

[22] Filed: Mar. 28, 1975

[21] Appl. No.: 562,890

[30] Foreign Application Priority Data
Apr. 11, 1974  France .............................. 74.12808

[52] U.S. Cl. ............. 248/180; 248/184; 248/188.4; 33/299
[51] Int. Cl.² ...................................... F16M 11/12
[58] Field of Search ........... 248/177, 178, 180, 184, 248/179, 183, 186, 188.1, 188.2, 188.3, 188.4; 33/290, 291, 292, 299, 281

[56] References Cited
UNITED STATES PATENTS
2,647,320  8/1953  Keuffel et al. ........................ 33/299
3,799,484  3/1974  Muller et al. ...................... 248/188.2

FOREIGN PATENTS OR APPLICATIONS
1,495,545  8/1967  France ............................ 248/177
1,166,975  11/1958  France ............................ 248/186
518,148    2/1940  United Kingdom .................. 33/299

Primary Examiner—Roy D. Frazier
Assistant Examiner—Robert A. Hafer

[57] ABSTRACT

This adjustable base, notably for topometric and similar apparatus, comprises a case, a movable member in said case having a substantially vertical axis and bearing on the bottom of said case through three balls, a pair of screws perpendicular to each other for adjusting the verticality of the axis of said movable member, at least one return spring, a pair of passages formed partly in the bottom of said case and partly in the opposite lower face of the movable member, the first passage being defined by a flat surface and by a V-sectioned groove converging toward each other in the direction of a first one of the three balls, the second passage being defined by two other V-sectioned grooves converging toward each other in the direction of said first ball, the two other balls being disposed each in a respective one of the two passages, and each adjustment screw engaging the ball disposed in the relevant passage for pivoting the movable member about the first ball.

6 Claims, 3 Drawing Figures

3,931,947

ADJUSTABLE BASE, NOTABLY FOR TOPOMETRY APPARATUS

BACKGROUND OF THE INVENTION:

1. Field of the Invention:

The present invention relates to adjustable bases or supports, notably for topometric apparatus, of the type comprising essentially a case opening upwards and, in said case a movable member having a substantially vertical axis, adapted to be secured to the apparatus and bearing on the bottom of the case through a ball of which the centre determines a fixed swivel point of the movable member in relation to said case, a pair of screws for adjusting the verticality of the axis of said movable member, which are disposed in substantially vertical planes perpendicular to each other, the centre of said swivel ball lying on the intersection of said vertical planes, and at least one return spring adapted to urge said movable member in a direction such as to cause said member to tilt in a direction opposite to that obtained by screwing in said screws.

2. Description of the Prior Art.:

An adjustable base or support of this general type is already known, notably through French Pat. No. 1,495,545 to the same Applicant. Although the device described in said French patent provides many advantages in comparison with previously known adjustable bases, notably as far as the rapidity of adjustment of the verticality of the axis of said movable member is concerned since the two adjustment screws operate independently of each other and the adjustments accomplished with one screw do not interfere with the adjustments made with the other screw, this known device is, however, attended by some inconveniences. More precisely, this known device is of a particularly elaborate construction, which is obviously objectionable for a mass production, inasmuch as the component elements of the device must be machined with a relatively high degree of precision. Moreover, as a consequence of substantial frictional contacts, the adjustments suffer from a want of smoothness.

SUMMARY OF THE INVENTION:

It is therefore the essential object of the present invention to avoid these inconveniences by providing an adjustable base notably for topometric apparatus which is constructionally simple and capable of being adjusted with all the desired smoothness.

To this end, the invention provides a base of the type broadly set forth above, characterized in that it comprises a pair of passages perpendicular to each other and containing each a ball through which said movable member bears on the bottom of said case, said pair of passages being disposed in said perpendicular planes respectively and formed partly in the bottom of said case and partly in the opposite surface of said movable member, a first one of said passages being defined by a flat surface and by a V-sectioned groove converging toward each other in the direction of said swivel ball, the other passage being defined by a pair of other V-sectioned grooves converging towards each other in the direction of said swivel ball, that the two balls disposed in said passages respectively are movable therein, and that the pair of adjustment screws are adapted each to push a respective one of said two balls in the relevant passage and thus cause said movable member to tilt about the centre of said swivel ball.

Now due to the use not only of two balls received in said guide passage but also of a specific configuration of the two guide passages constituting, in conjunction with said swivel ball, an isostatic guiding system, the verticality of the axis of said movable member may be adjusted with a considerable degree of smoothness without requiring a high degree of precision in the manufacture and machining of the component elements of the base.

BRIEF DESCRIPTION OF THE DRAWING.

A detailed description of a preferred embodiment of the present invention will now be given by way of illustration, not of limitation, with reference to the accompanying drawing, in which.

Figure 1:
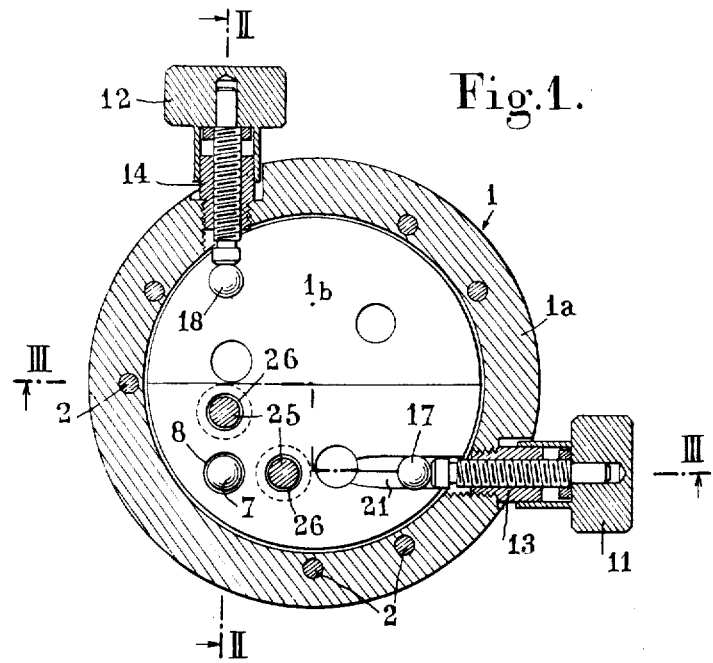
FIG. 1 is a horizontal section showing a portion of an adjustable base according to this invention the movable member thereof having been removed to show the components underlying same.

DESCRIPTION OF THE PREFERRED EMBODIMENT.

The base illustrated in the drawing comprises a cylindrical case 1, consisting of two elements 1a and 1b assembled by means of screws 2, and a movable member 3 (not shown in FIG. 1) of substantially cylindrical configuration, having a substantially vertical axis. This movable member 3 is housed in said case 1 and projects therefrom through an upper aperture 4 thereof so that said movable member can be secured to an apparatus (not shown), notably a topometric apparatus such as a level, an alidade, a theodolite or the like, by means of screws 5. To the underface of this case 1 is secured a plate 6 comprising at its centre an internally screw-threaded boss or like portion whereby the assembly can be secured to a support such as a tripod (not shown).

The movable member 3 bears on the bottom element 1b of casing 1 by means of a ball 7 received partly in a conical recess 8 formed in the bottom 1b of said case and partly in a conical recess 9 formed in the opposite surface of movable member 3. The centre of said ball 7 determines a fixed point for swivelling the movable member 3 in relation to the case bottom. In the embodiment shown, the recesses 8 and 9, and consequently the ball 7 are disposed at an eccentric location in relation to the vertical axis of said movable member 3 as shown more particularly in FIG. 1. Of course, it would not constitute a departure from the principles of this invention to align said recesses 8 and 9, and ball 7, with respect to the vertical axis of movable member 3.

A pair of screws 11 and 12 are provided for adjusting the verticality of the axis of said movable member 3. These two screws 11 and 12 are located in substantially vertical planes perpendicular to each other, and the intersection of these two planes passes through the centre of ball 7. Preferably, the axes of screws 11 and 12 are perpendicular to each other and intersect each other substantially at the centre of said ball 7, as shown in the drawing. The pair of screws 11 and 12 are engaged in sockets 13 and 14, respectively, and these sockets 13 and 14 are screwed in turn in tapped holes formed through the cylindrical wall of element 1a of case 1. Furthermore, these sockets 13 and 14 are locked against movement in these tapped holes by set screws 15 and 16, respectively.

A pair of guide passages are provided for a pair of balls 17 and 18, respectively, in the bottom 1b of case 1 and in the opposite surface of the movable member 3. These passages are located in the two above-mentioned substantially vertical planes, respectively, which are perpendicular to each other and contain the axes of screws 11 and 12, respectively.

Figure 3:
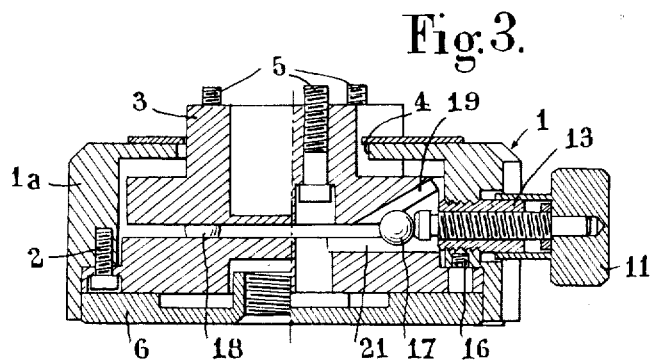
FIG. 3 is another section but taken along the broken line III—III of FIG. 1, and also showing the movable member fitted in said base.

As shown more in detail in FIG. 3, the guide passage for ball 17 is defined by a pair of V-sectioned grooves 19 and 21 converging both towards each other in the direction of ball 7. Preferably, the groove 21 formed in the bottom 1b of case 1 extends at right angles to the intersection of the two vertical above-mentioned planes, that is, in the position of the components which is illustrated in FIG. 3, substantially perpendicularly to the vertical axis of the movable member 3. Under these conditions, the groove 19 formed in said movable member 3 must extend obliquely in relation to said intersection or, in the example illustrated in the drawing to the axis of the movable member 3. Moreover, the groove 21 extends preferably at such level that the centre of ball 17 remains constantly on the axis of screw 11 on which the centre of ball 7 is also located.

Figure 2:
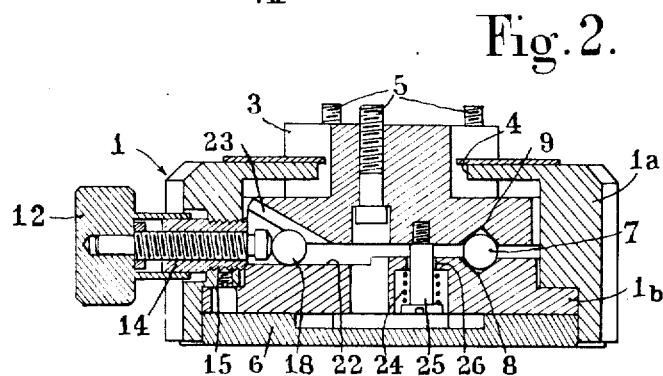
FIG. 2 is a section taken along the line II—II of FIG. 1, but showing the movable member fitted in the base.

The passage for guiding the ball 18 is defined by a flat surface 22 and a V-sectioned groove 23 converging both towards each other in the direction of ball 7. As shown more particularly in FIG. 2, the flat surface 22 is formed preferably on the bottom plate 1b of case 1, and groove 23 is formed preferably in the opposite face of movable member 3. Moreover, the flat surface 22 extends preferably at right angles to the intersection of the two above vertical planes perpendicular to each other, that is, in the position of the component elements which is illustrated in FIG. 2, substantially at right angles to the axis of movable member 3. Thus, groove 23 must extend in an oblique direction with respect to this intersection. Moreover, the flat face 22 is formed preferably at such a level that the centre of ball 18 remains constantly on the axis of screw 12 on which axis is also located the centre of ball 7.

With this specific arrangement, when the screw 11 is screwed in its socket 13, the ball 17 is moved towards the ball 7 and causes the movable member 3 to tilt about the axis defined by the centres of balls 7 and 18 (which axis is merged into that of screw 12). Likewise, when screw 12 is screwed in socket 14, ball 18 is moved towards ball 7 and causes the movable member 3 to tilt about the axis defined by the centres of balls 7 and 17 (which axis is merged into the axis of screw 11).

A pair of return springs 24 (of which only one is visible in FIG. 2) are provided for constantly urging the movable member 3 against the three balls 7, 17 and 18 and also for urging the movable member 3, each in a direction causing this member 3 to tilt in a direction opposite to that obtained when one of the pair of screws 11 and 12 is screwed in. As shown in FIG. 2, each spring 24 bears on the one hand against the bottom of a cavity formed in the lower face of bottom 1b of case 1 and, on the other hand, against the head of a screw 25 extending coaxially through said spring 24 and through a hole 26 formed in the bottom of said cavity and engaging a tapped hole formed in said movable member 3. As shown in FIG. 1, the centre of each screw 25 is aligned with the centre of ball 7 and the centre of ball 17 or 18, and lies between these two last-mentioned centres.

Of course, it will readily occur to those conversant with the art that the specific embodiment of the invention which is illustrated and described herein is given by way of illustration, not of limitation; and that many modifications and changes may be brought thereto without departing from the basic principles of the invention as set forth in the appended claims.

What is claimed as new is:

1. An adjustable base for topometric and similar apparatus, which comprises a case opening upwards and comprising a bottom having a substantially flat and horizontal inner face with a recess within said face, a movable member in said case having a substantially vertical axis, adapted to be secured to the topometric apparatus and comprising a lower, substantially flat face opposite said flat inner face of the case bottom and having a recess formed within said lower flat face which registers with the recess of said case bottom, a first ball received in said registering recesses and constituting a swivel point for said movable member in relation to said case, a pair of passages located in substantially vertical planes and perpendicular to each other, said planes intersecting each other along a straight line passing through the centre of said first ball, each passage being formed partly in the inner face of said case bottom and partly in the opposite lower face of said movable member, a first one of said passages being defined by a flat surface and by a V-sectioned groove converging toward each other in the direction of said first ball, the second passage being defined by two other V-sectioned grooves converging toward each other in the direction of said first ball, two other balls disposed in said first and second passages respectively for supporting said movable member on the case bottom, a pair of screws for adjusting the verticality of the axis of said movable member, said adjustment screws being disposed in said perpendicular planes respectively and each adjustment screw being adapted to push a respective one of said two other balls in the relevant passage towards said first ball in order to cause said movable member to pivot about an axis defined by said first ball and the other, one of said two other balls, and spring means for urging said movable members towards the bottom of said case to bear thereagainst through said three balls.

2. An adjustable base as set forth in claim 1, wherein said flat surface defining partly the first passage is formed in the case bottom and extends at right angles to the intersection of said two perpendicular planes, and the V-sectioned groove defining partly the first passage is formed in said movable member and extends obliquely in relation to said intersection.

3. An adjustable base as set forth in claim 2, wherein said V-sectioned groove defining partly said second passage is formed in the case bottom and extends at right angles to the intersection of said two perpendicular planes, and said V-sectioned groove defining partly said second passage is formed in said movable member and extends obliquely in relation to said intersection.

4. An adjustable base as set forth in claim 3, wherein the axes of said adjustment screws are perpendicular to, and intersect, each other at the centre of said first ball, the flat surface defining partly said first passage and the V-sectioned groove formed in the case bottom being located at such a level that the centres of the other two balls in said passages remain constantly on the axes of the adjustment screws which pass through the centre of said first ball.

5. An adjustable base as set forth in claim 1, wherein said spring means comprises a pair of return springs, each spring acting upon said movable member at a point which, in a plan view, is aligned to the centre of said first ball and the centre of a respective one of said other two balls, said point being disposed between said two last-mentioned centres.

6. An adjustable base as set forth in claim 1, wherein said first ball is eccentric in relation to the axis of said movable member.

* * * * *